(12) United States Patent
Ilievski et al.

(10) Patent No.: US 10,773,725 B1
(45) Date of Patent: Sep. 15, 2020

(54) TIRE-ROAD FRICTION ESTIMATION AND MAPPING

(71) Applicants: Filip Ilievski, Belmont, CA (US); Matisse J. Milovich, Cupertino, CA (US); Christopher M. Miller, Cupertino, CA (US); Budhadipta Dan, San Jose, CA (US); Jack E. Graves, Cupertino, CA (US); Evan C. Cull, Sunnyvale, CA (US); Irene Perali, San Francisco, CA (US); Mira S. Misra, Los Gatos, CA (US); Sheila P. Nabanja, Oakland, CA (US); Lucian Ion, Mountain View, CA (US); James J. Reuther, San Francisco, CA (US); Christy F. Cull, Sunnyvale, CA (US)

(72) Inventors: Filip Ilievski, Belmont, CA (US); Matisse J. Milovich, Cupertino, CA (US); Christopher M. Miller, Cupertino, CA (US); Budhadipta Dan, San Jose, CA (US); Jack E. Graves, Cupertino, CA (US); Evan C. Cull, Sunnyvale, CA (US); Irene Perali, San Francisco, CA (US); Mira S. Misra, Los Gatos, CA (US); Sheila P. Nabanja, Oakland, CA (US); Lucian Ion, Mountain View, CA (US); James J. Reuther, San Francisco, CA (US); Christy F. Cull, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/108,792

(22) Filed: Aug. 22, 2018

Related U.S. Application Data

(60) Provisional application No. 62/550,252, filed on Aug. 25, 2017.

(51) Int. Cl.
*G08G 1/00* (2006.01)
*B60W 40/068* (2012.01)

(52) U.S. Cl.
CPC ....... *B60W 40/068* (2013.01); *B60W 2420/40* (2013.01); *B60W 2530/20* (2013.01);
(Continued)

(58) Field of Classification Search
CPC .......... B60W 40/068; B60W 2420/40; B60W 2550/147; B60W 2550/12;
(Continued)

(56) References Cited

U.S. PATENT DOCUMENTS 5,774,070 A * 6/1998 Rendon ................ G08G 1/0104
340/905
6,370,475 B1 * 4/2002 Breed .................. B60N 2/2863
340/436

(Continued)

FOREIGN PATENT DOCUMENTS

EM 2327976 A2 6/2011
EM 2402737 A1 1/2012
(Continued)

OTHER PUBLICATIONS

Marwis, "Mobile Collection of Weather Data in Real Time With Marwis", Road Sensor / Sensor System / Measuring Road Condition / Measurement of Environmental Data / Date Unknown, Downloaded Apr. 16, 2018, http://www.lufft-marwis.com/en_US/features, 3 pp.

(Continued)

*Primary Examiner* — Khoi H Tran
*Assistant Examiner* — B M M Hannan
(74) *Attorney, Agent, or Firm* — Young Basile Hanlon & MacFarlane, P.C.

(57) ABSTRACT

A method includes determining temperature values for roadway areas ahead of a vehicle, determining lubricant state
(Continued)

values for the roadway areas, and determining lubricant thickness values for the roadway areas. The method also includes determining a tire-road friction estimate for each of the roadway areas using the temperature values, the lubricant state values, and the lubricant thickness values, and defining a friction map that relates the tire-road friction estimates to the roadway areas. The method also includes determining a motion plan based at least in part on the friction map, and controlling the vehicle based on the motion plan.

22 Claims, 9 Drawing Sheets

(52) U.S. Cl.
CPC ..... *B60W 2552/35* (2020.02); *B60W 2552/40* (2020.02); *B60W 2555/20* (2020.02)

(58) Field of Classification Search
CPC ....... B60W 2550/148; B60W 2530/20; B60W 40/064; B60W 2420/403; B60W 2420/406; B60W 2420/42; B60W 2420/50; B60W 2550/14
USPC .................................................... 701/80, 117
See application file for complete search history.

(56) References Cited

U.S. PATENT DOCUMENTS

| | | | | |
|---|---|---|---|---|
| 6,459,083 | B1 * | 10/2002 | Finkele | B60Q 9/008 250/339.1 |
| 6,526,352 | B1 * | 2/2003 | Breed | G01C 21/3697 701/470 |
| 7,400,267 | B1 * | 7/2008 | Doherty | G08G 1/096811 340/580 |
| 9,139,204 | B1 | 9/2015 | Zhao et al. | |
| 9,541,408 | B2 | 1/2017 | Stahlin et al. | |
| 9,555,812 | B2 | 1/2017 | Parchami | |
| 10,358,233 | B1 * | 7/2019 | Tiana | B64D 45/08 |
| 2005/0134440 | A1 * | 6/2005 | Breed | B60N 2/2863 340/435 |
| 2006/0208169 | A1 * | 9/2006 | Breed | B60N 2/002 250/221 |
| 2008/0167821 | A1 * | 7/2008 | Breed | G08G 1/161 701/301 |
| 2010/0020170 | A1 * | 1/2010 | Higgins-Luthman | B60Q 1/1423 348/135 |
| 2010/0100275 | A1 * | 4/2010 | Mian | G01M 17/013 701/31.4 |
| 2010/0141765 | A1 | 6/2010 | Capello et al. | |
| 2011/0264300 | A1 | 10/2011 | Tuononen | |
| 2012/0327410 | A1 | 12/2012 | Maston | |
| 2013/0103274 | A1 | 4/2013 | Binder et al. | |
| 2013/0116972 | A1 | 5/2013 | Hanatsuka et al. | |
| 2014/0074388 | A1 * | 3/2014 | Bretzigheimer | B60T 1/10 701/117 |
| 2014/0163770 | A1 * | 6/2014 | Wakao | B60W 40/068 701/1 |
| 2014/0210644 | A1 | 7/2014 | Breed | |
| 2015/0019103 | A1 | 1/2015 | Choi et al. | |
| 2015/0166072 | A1 | 6/2015 | Powers et al. | |
| 2015/0224925 | A1 | 8/2015 | Hartmann | |
| 2015/0251659 | A1 | 9/2015 | Fischer et al. | |
| 2015/0367855 | A1 | 12/2015 | Parchami | |
| 2015/0375753 | A1 * | 12/2015 | Schrabler | B60T 8/172 701/71 |
| 2016/0121902 | A1 | 5/2016 | Huntzicker et al. | |
| 2016/0176408 | A1 | 6/2016 | Lynch | |
| 2016/0259038 | A1 * | 9/2016 | Retterath | G01S 7/4802 |
| 2017/0072834 | A1 | 3/2017 | Schmitz-Hubsch | |
| 2018/0151075 | A1 * | 5/2018 | Claesson | H04W 4/029 |
| 2018/0217050 | A1 * | 8/2018 | Heil | B60T 8/172 |
| 2018/0222462 | A1 * | 8/2018 | Varnhagen | B60T 8/17636 |
| 2018/0304898 | A1 * | 10/2018 | Yoshikawa | G06K 9/52 |
| 2019/0210597 | A1 * | 7/2019 | Mukai | B60W 40/068 |
| 2019/0294167 | A1 * | 9/2019 | Kutila | G01C 21/3461 |

FOREIGN PATENT DOCUMENTS

| | | | |
|---|---|---|---|
| EM | 2936389 B1 | 9/2016 | |
| EM | 3113979 A1 | 1/2017 | |
| JP | 4262133 B2 | 5/2009 | |
| WO | 1997039918 A1 | 10/1997 | |
| WO | 2010019045 A1 | 2/2010 | |
| WO | 2011007015 A1 | 1/2011 | |
| WO | 2012087150 A1 | 6/2012 | |
| WO | WO2018038211 * | 3/2018 | ............ B60W 30/09 |
| WO | WO2017068743 * | 7/2018 | ............ B60W 40/06 |

OTHER PUBLICATIONS

Casselgren, Johan, "Road Condition Ahead", University of Gothenburg, Lulea University of Technology, Date Unknown, Downloaded Apr. 16, 2018, 19 pp.

* cited by examiner

TIRE-ROAD FRICTION ESTIMATION AND MAPPING

This application claims the benefit of U.S. Provisional Application No. 62/550,252, filed on Aug. 25, 2017, entitled "Tire-Road Friction Estimation and Mapping," the content of which is incorporated herein by reference for all purposes.

TECHNICAL FIELD

The application relates generally to tire-road friction estimation.

BACKGROUND

The amount of available tire-road friction affects the ability of a vehicle to perform maneuvers such as braking and turning. Tire-road friction may be estimated by a vehicle-mounted system. One known method utilizes reaction forces as a basis for estimating tire-road friction. Another known method utilizes one or more point measurements taken at a location under or near the vehicle as a basis for estimating available tire-road friction.

SUMMARY

One aspect of the disclosed embodiments is a method that includes determining temperature values for roadway areas ahead of a vehicle, determining lubricant state values for the roadway areas, and determining lubricant thickness values for the roadway areas. The method also includes determining a tire-road friction estimate for each of the roadway areas using the temperature values, the lubricant state values, and the lubricant thickness values, and defining a friction map that relates the tire-road friction estimates to the roadway areas. The method also includes determining a motion plan based at least in part on the friction map, and controlling the vehicle based on the motion plan.

Another aspect of the disclosed embodiments is a system includes a sensor group and a friction estimation unit. The sensor group includes one or more near infrared (NIR) light sources that output electromagnetic radiation in at least a first NIR wavelength band and a second NIR wavelength band, a first NIR imaging device that is sensitive to electromagnetic radiation in the first NIR wavelength band and outputs a first NIR image representing a roadway, a second NIR imaging device that is sensitive to electromagnetic radiation in the second NIR wavelength band and outputs a second NIR image representing the roadway, a first long wave infrared (LWIR) imaging device that is sensitive to electromagnetic radiation in a first LWIR wavelength band and outputs a first LWIR image representing the roadway, and a second LWIR imaging device that is sensitive to electromagnetic radiation in a second LWIR wavelength band and outputs a second LWIR image representing the roadway. A friction estimation unit defines portions corresponding to roadway areas of each of the first NIR image, the second NIR image, the first LWIR image, and the second LWIR image, determines tire-road friction estimates for the each of the roadway areas using the portions, and defines a friction map that relates the tire-road friction estimates to the roadway areas.

Another aspect of the disclosed embodiments is a system that includes a sensor group, an aiming assembly, and a friction estimation unit. The sensor group includes one or more near infrared (NIR) light sources, a first optical intensity detector, a second optical intensity detector, a first pyrometer, and a second pyrometer. The aiming assembly is operable to change an angular orientation of the sensor group. The friction estimation unit determines tire-road friction estimates for roadway areas based on signals output by the sensor group at multiple angular orientations and defines a friction map that relates the tire-road friction estimates to the roadway areas.

DETAILED DESCRIPTION

The disclosure herein is directed to systems and methods that estimate tire-road friction for multiple areas ahead of a vehicle. Tire-road friction cannot be measured directly. Instead, tire road friction is estimated using indirect measurements. The systems and methods herein utilize non-contact sensors to measure properties of the areas of the roadway ahead of the vehicle. The measured properties are used as a basis for estimating tire-road friction. By associating each of the measurements with an area ahead of the vehicle, a friction value map can be generated. The friction value map can be a two-dimensional representation of the roadway that correlates the estimated friction values to the areas ahead of the vehicle.

The friction value map can be used by an automated control system to aid control decisions. The vehicle can utilize knowledge of friction values for areas on the roadway ahead of the vehicle, as encoded in the friction value map, as inputs to the automated control system to more accurately determine vehicle handling limits, to avoid traversing areas of the roadway that have low friction values, and react to unexpected hazardous situations.

Figure 1:
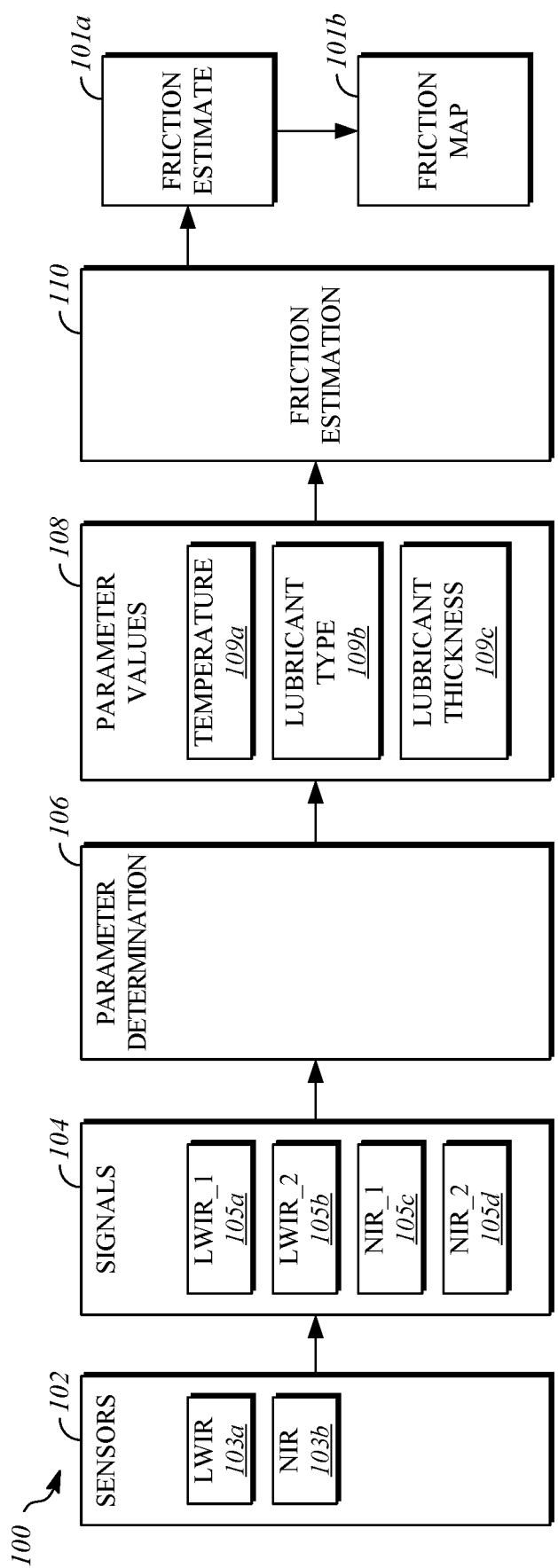
FIG. 1 is a block diagram that shows a friction estimation system.

FIG. 1 is a block diagram that shows a friction estimation system 100. The friction estimation system is operable to determine a friction estimate 101a and output a friction map 101b. As will be described herein, the friction estimation system 100 can be carried by a movable structure, such as vehicle. The friction estimation system 100 utilizes remote, non-contact measurements to measure environmental properties that can be used as a basis for estimating friction. These characteristics are measured at multiple locations within the environment around the friction estimation system 100, such as spaced locations within a range of five through fifty meters away from the friction estimation system 100, and the friction estimate 101a can be determined at each of these locations and added to the friction map 101b. The friction map 101b represents friction values in an area around the friction estimation system 100, such as on areas of a roadway if the friction estimation system 100 is implemented in a vehicle. The friction map 101b may be represented as friction estimates 101a that each correspond to a point or an area (e.g., a roadway portion). Areas can be square, rectangular, or irregular. The friction estimates 101a for an area can be based on multiple measurements or average measurements for the area. In one implementation, the friction map 101b is represented as a grid of adjacent areas that are each associated with a friction value. For example, the areas can be squares between 0.5 meters wide and 2.0 meters wide.

Friction is estimated primarily using knowledge of presence of a lubricant on a surface, the physical state of the lubricant, a thickness of the lubricant on the surface, and the temperature of the lubricant. As used herein, the term "lubricant" refers to any material that is located on a surface that is supporting the vehicle and that may come between the surface and the tires of the vehicle to alter the available friction. Typically, a lubricant has a lower coefficient of friction than the surface and reduces the friction between the tires and the combined surface/lubricant layer. In examples where the surface is a road surface, the lubricant is anything that may come between the road surface and the tires of the vehicle. When traversed, some lubricants may only cover part of the tire contact patch of the tire as opposed to the whole area of the contact patch, and their coverage may change as the tires rolls over them. Examples of lubricants include liquid water, ice, and slush, leaves, gravel, sand, dust, and oil. This primary estimation based on the lubricant can be supplemented using additional information, as will be described further herein.

The friction estimation system 100 includes sensors 102 that generate signals 104, a parameter determination unit 106 that determines parameter values 108 based on the signals 104, and a friction estimation unit 110 that determines the friction estimate 101a based on the parameter values. The parameter determination unit 106 and the friction estimation unit 110 may be implemented as computing units that include a computing device (e.g., a processor and a memory) that execute computer program instructions. Other implementations are possible.

The sensors 102 include devices that are able to detect long wave infrared (LWIR) radiation, such as one or more LWIR sensors 103a. The LWIR sensors can include multiple sensors or sensor outputs that are each sensitive to LWIR radiation in a different frequency band, and output information representing an amount of incident radiation in that frequency band. The sensors 102 also include devices that are able to detect near infrared (NIR) radiation, such as one or more NIR sensors 103b. The NIR sensors 103b can include multiple sensors or sensor outputs that are each sensitive to NIR radiation in a different wavelength band and output information representing an amount of incident radiation in that wavelength band.

The signals 104 are that output by the sensors 102 that are useful for estimating friction values. In the illustrated example, the signals 104 include LWIR signals that are output by the LWIR sensors 103a such as a first LWIR signal 105a and a second LWIR signal 105b. The first LWIR signal 105a represents a measurement of LWIR radiation for a first LWIR wavelength band and the second LWIR signal 105b represent measurements of LWIR radiation for a second LWIR wavelength band.

The signals 104 that are output by the sensors 102 also include near infrared (NIR) signals such as a first NIR signal 105c and a second NIR signal 105d. The first NIR signal 105c represents a measurement of NIR radiation for a first NIR wavelength band and the second NIR signal 105d represents a measurement of NIR radiation for a second NIR wavelength band.

The parameter determination unit 106 receives the signals 104 and interprets the signals to determine the parameter values 108. The parameter values 108 are signals 104 and are useful for friction estimation. The parameter values 108 include a temperature value 109a, a lubricant state value 109b, and a lubricant thickness value 109c.

The first LWIR signal 105a and the second LWIR signal 105b are used by the parameter determination unit 106 to determine thermal emissivity of the surface area for which friction is being estimated. Thermal emissivity is utilized by the parameter determination unit 106 as an intermediate value that is utilized by the parameter determination unit 106, for example, to determine the temperature value 109a and the lubricant state value 109b. Since emissivity is wavelength-dependent, emissivity can be determined by a comparison of the first LWIR signal 105a and the second LWIR signal 105b. These signals represent measurements made at different wavelengths, such as in a first LWIR wavelength band and a second LWIR wavelength band, and the signals can be analyzed to identify differences that are dependent on emissivity. The emissivity-dependent differences can be used to determine the thermal emissivity of the surface. This determination can be made using, for example, information that describes wavelength-dependent emissivity characteristics, such as a function or a lookup table.

The first LWIR signal 105a and the second LWIR signal 105b are used by the parameter determination unit 106 to determine temperature. Temperature can be determined by the parameter determination unit 106 using pyrometry methods. For example, a relative temperature measurement can be determined based on the first LWIR signal 105a and the second LWIR signal 105b. The relative temperature measurement is based on the amount of radiation in a specific wavelength band that is emitted from a surface. The relative temperature measurement does not account for emissivity, which describes the ability of a particular type of material to emit radiation. Using the emissivity value for the surface being measured, determined as previously described, a calibration factor is determined that relates the relative temperature measurement to actual temperature, which allows determination of actual temperatures from the relative temperatures.

The emissivity value that was determined using the first LWIR signal 105a and the second LWIR signal 105b, as previously described, is used to determine the lubricant state value 109b. The lubricant state value 109b represents the physical state of the lubricant. The lubricant film can be a film of water (in the form of liquid, slush, or ice) or a film of contaminants such as transmission fluid or motor oil. The lubricant state value 109b describes whether the lubricant is in the liquid state, a semi-solid state (e.g., slush), or a solid state (e.g., ice). The lubricant state value 109*b* is determined by comparing the emissivity value to known values or ranges of values of expected emissivity values for types of lubricants in particular physical states. This comparison can be performed, for example, using a lookup table.

The first NIR signal 105*c* and the second NIR signal 105*d* are used by the parameter determination unit 106 to determine the lubricant thickness value 109*c*. In particular, the parameter determination unit 106 utilizes differential spectroscopy techniques to analyze the first NIR signal 105*c* and the second NIR signal 105*d*. Different wavelengths of radiation will be affected differently by the lubricant film. Some wavelengths of radiation will not be affected by the lubricant film because the lubricant film does not absorb radiation at that wavelength. Other wavelengths of radiation are absorbed by the lubricant film by an amount that is a function of the thickness of the lubricant film. Accordingly, the first NIR signal 105*c* and the second NIR signal 105 can be used to determine the lubricant thickness value. In one implementation, the wavelength of the first NIR signal 105*c* can be selected so that reflection of the first NIR signal 105*c* is affected by the presence of expected types of the lubricant (e.g., water) on the surface being measured, and the wavelength of the second NIR signal 105*d* can be selected so that reflection of the second NIR signal 105*d* is not affected by the presence of the lubricant on the surface being measured.

The lubricant thickness value 109*c* inherently describes whether lubricant is present on the surface. If the lubricant thickness value 109*c* is equal to zero, lubricant is not present on the surface in detectable quantities (i.e., no lubricant may be present or the lubricant may be present in undetectable quantities). If the lubricant thickness value is greater than zero, lubricant is present on the surface. Thus, the presence or absence of the lubricant on a surface can be used as an additional basis for estimating tire-road friction.

The friction estimation unit 110 uses multiple parameters as a basis for estimating friction and generating the friction estimate 101*a*. The friction estimate 101*a* can be expressed as a coefficient of friction (i.e., the ratio of a force of friction between two bodies and a normal force between them.

The parameters utilized by the friction estimation unit 110 include the temperature value 109*a*, the lubricant state value 109*b*, and the lubricant thickness value 109*c*. Additional parameters that can be utilized by the friction estimation unit 110 include lubricant composition, surface composition, surface roughness, and surface moisture. Lubricant composition can be determined based on a reflectance value that measures the proportion of incident radiation that is reflected by a surface, by comparing the reflectance values of areas of an image to known reflectance values of lubricants. Surface roughness can be measured, for example, using structured light, by analyzing a structured light (e.g., infrared) pattern that is projected on a surface and captured using a camera as a structured light signal. Surface moisture, when no lubricant film is detectable, can be estimated using a humidity signal from a humidity sensor that measures humidity in the air.

In one implementation, the friction estimation unit 110 can determine an initial friction estimate using one or more of the parameter values 108, and the initial friction estimate can be modified using correction factors that are determined based on other ones of the parameters to determine the friction estimate 101*a*. For example, the initial friction estimate can be based on the lubricant state value 109*b* and the lubricant thickness value 109*c*. The initial friction estimate can be modified by correction factors based on the temperature value 109*a* and/or other parameters.

In another implementation, the friction estimation unit 110 can determine an initial friction estimate using one or more of the parameter values 108 and a lookup table that relates one or more of the parameter values 108 to friction values. As examples, the lookup table can be a one-dimensional lookup table, a two-dimensional lookup table, or a three-dimensional lookup table. Additional values from the parameter values 108 can be utilized as correction factors to modify the initial friction estimate.

In another implementation, a multi-dimensional model can be developed manually to determine the friction estimate 101*a* based on one or more of the parameter values 108. For example, the model can be implemented as an equation or as a system of equations.

In another implementation, the friction estimation unit 110 determines the friction estimate 101*a* using a machine learning model. As an example, a machine learning model can be trained using ground truth information that includes a measured friction value and a corresponding set of the parameter values 108 including the temperature value 109*a*, the lubricant state value 109*b*, and the lubricant thickness value 109*c* that were measured for the same area where the friction value was measured. By providing a large number of ground truth values to the machine learning model, the friction estimation unit 110 determines relationships between the parameter values 108 and friction values that allow the friction estimation unit 110 to determine the friction estimate 101*a* based on the parameter values 108. To obtain additional ground truth information additional friction sensing modalities, such as contact friction sensors, could be used in combination with the sensor assemblies described herein.

Figure 2:
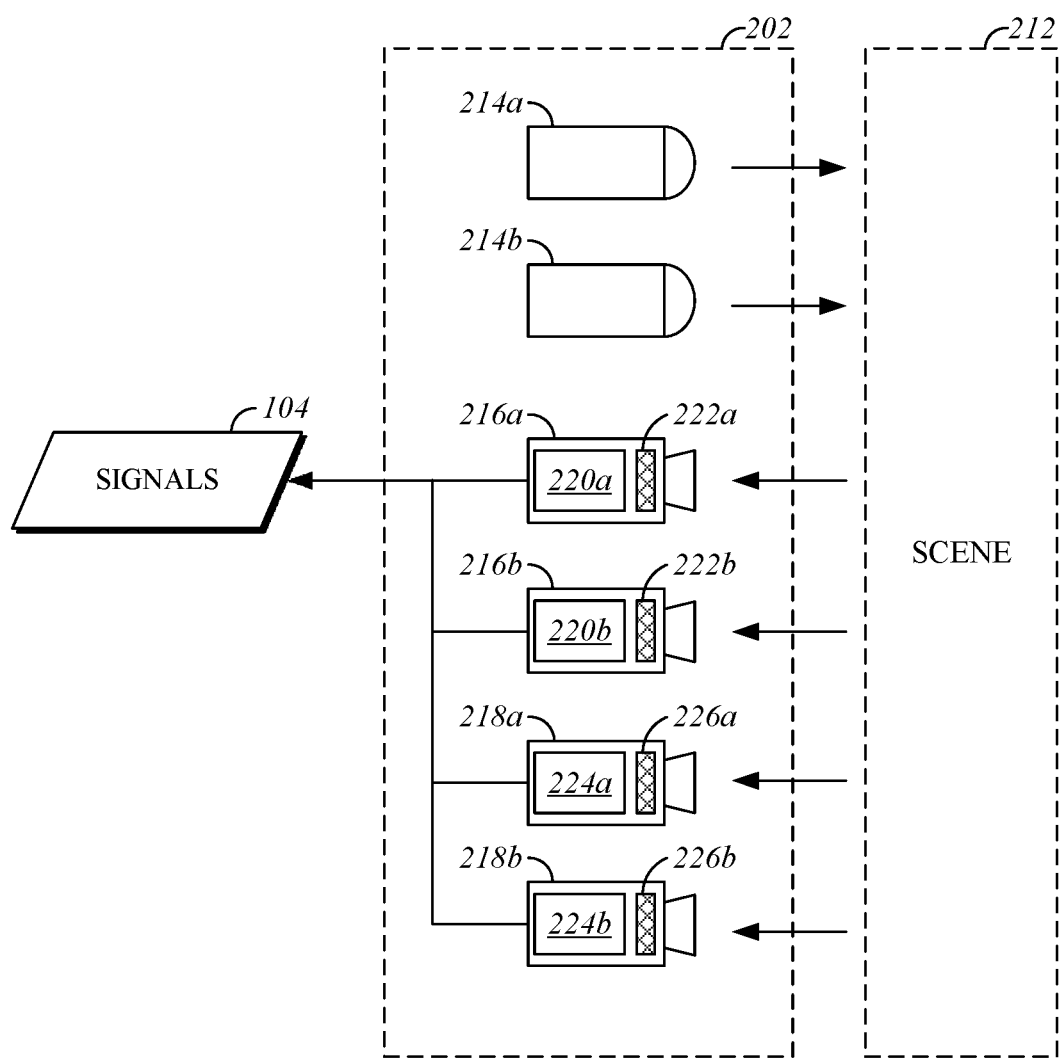
FIG. 2 is a block diagram that shows a first example of a hardware configuration for a sensor assembly.

FIG. 2 is a block diagram that shows a first example of a hardware configuration for a sensor assembly 202. The sensor assembly 202 outputs image-based measurements that can be utilized as a basis for friction estimation. The sensor assembly 202 can be utilized as the sensors 102 of the friction estimation system 100, to provide some or all of the signals 104 that are utilized by the parameter determination unit 106.

The sensor assembly 202 is operable to measure properties of a scene 212. The scene 212 is a portion of the environment around the sensor assembly 202. As an example, if the sensor assembly 202 is installed in a vehicle, the scene 212 may be or include a portion of a roadway that the vehicle is travelling on. The range over which at least some sensors included in the sensor assembly 202 can perceive information about the scene 212 may be, for example, several hundred meters.

The sensor assembly 202 includes a first NIR light source 214*a*, a second NIR light source 214*b*, a first NIR imaging device 216*a*, a second NIR imaging device 216*b*, a first LWIR imaging device 218*a*, and a second LWIR imaging device 218*b*. The first NIR imaging device 216*a* includes a first NIR image sensor 220*a* and a first NIR filter 222*a*. The second NIR imaging device 216*b* includes a second NIR image sensor 220*b* and a second NIR filter 222*b*. The first LWIR imaging device 218*a* includes a first LWIR image sensor 224*a* and a first LWIR filter 226*a*. The second LWIR imaging device 218*b* includes a second LWIR image sensor 224*b* and a second LWIR filter 226*b*.

The first NIR light source 214*a* is operable to emit infrared radiation including infrared radiation having a wavelength that is included in a band that includes 905 nm. The second NIR light source 214*b* is operable to emit infrared radiation including infrared radiation having a wavelength that is included in a band that includes 1310 nm.

The infrared radiation emitted by the first NIR light source 214*a* is detectable by the first NIR imaging device 216*a*. The infrared radiation emitted by the second NIR light source 214*b* is detectable by the second NIR imaging device 216*b*.

The first NIR image sensor 220*a* and the second NIR image sensor 220*b* are each operable to output a series of raster images (e.g. video frames) that represent infrared radiation from the scene 212 that is incident on the first NIR image sensor 220*a* and the second NIR image sensor 220*b*. The first NIR image sensor 220*a* and the second NIR image sensor 220*b* may each be any type of image sensing device that is sensitive to light in the near-infrared spectrum. As one example, the first NIR image sensor 220*a* and the second NIR image sensor 220*b* may be indium gallium arsenide (InGaAs) sensors. Other types of sensors that are sensitive to the wavelength bands being measured may be used.

The first NIR filter 222*a* is bandpass filter that is operable to pass electromagnetic radiation from a first NIR wavelength band from the scene 212 to the first NIR image sensor 220*a*. Electromagnetic radiation outside of the first NIR wavelength band is blocked by the first NIR filter 222*a* and does not pass to the first NIR image sensor 220*a*. The second NIR filter 222*b* is bandpass filter that is operable to pass electromagnetic radiation from a second NIR wavelength band from the scene 212 to the second NIR image sensor 220*b*. Electromagnetic radiation outside of the second NIR wavelength band is blocked by the second NIR filter 222*b* and does not pass to the second NIR image sensor 220*b*. In one implementation, the first NIR wavelength band is centered on a wavelength of 905 nm, and the second NIR wavelength band is centered on a wavelength of 1310 nm.

The first LWIR image sensor 224*a* and the second LWIR image sensor 224*b* are each operable to output a series of raster images (e.g. video frames) that represent longwave infrared radiation from the scene 212 that is incident on the first LWIR image sensor 224*a* and the second LWIR image sensor 224*b*. The first LWIR image sensor 224*a* and the second LWIR image sensor 224*b* may each be any type of image sensing device that is sensitive to light in the LWIR spectrum. As example, the first LWIR image sensor 224*a* and the second LWIR image sensor 224*b* may be mercury-cadmium-telluride based sensors, multiple-quantum-well superlattice structure based detectors, or strained-layer superlattice structures based detectors. Other types of sensors that are sensitive to the wavelength bands being measured may be used.

The first LWIR filter 226*a* is bandpass filter that is operable to pass electromagnetic radiation from a first LWIR wavelength band from the scene 212 to the first LWIR image sensor 224*a*. Electromagnetic radiation outside of the first LWIR wavelength band is blocked by the first LWIR filter 226*a* and does not pass to the first LWIR image sensor 224*a*. The second LWIR filter 226*b* is bandpass filter that is operable to pass electromagnetic radiation from a second LWIR wavelength band from the scene 212 to the second LWIR image sensor 224*b*. Electromagnetic radiation outside of the second LWIR wavelength band is blocked by the second LWIR filter 226*b* and does not pass to the second LWIR image sensor 224*b*. In one implementation, the first LWIR wavelength band is centered on a wavelength of 8000 nm, and the second LWIR wavelength band is centered on a wavelength of 11000 nm.

Figure 3:
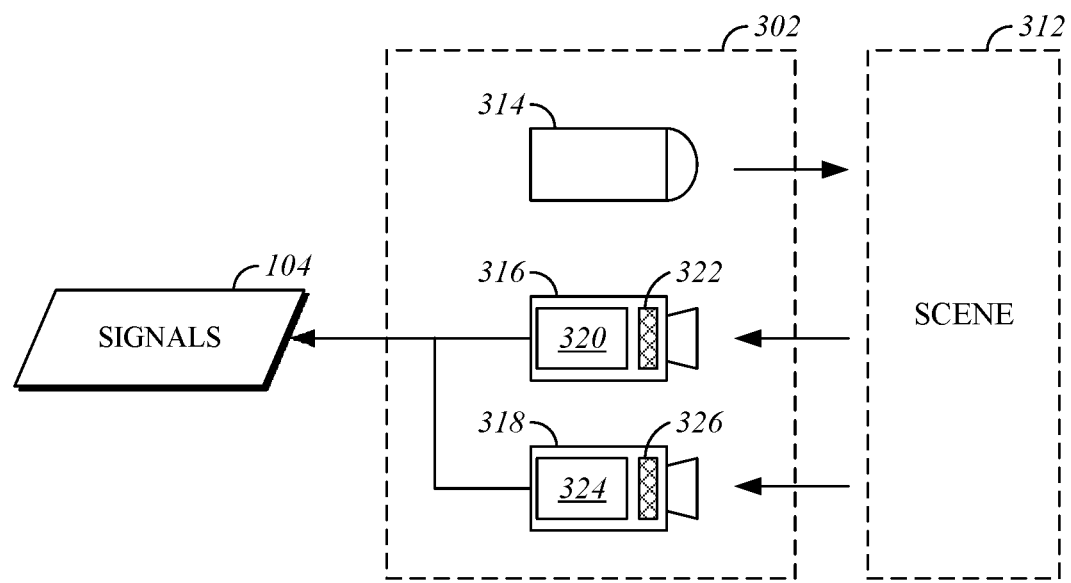
FIG. 3 is a block diagram that shows a second example of a hardware configuration for a sensor assembly.

FIG. 3 is a block diagram that shows a second example of a hardware configuration for a sensor assembly 302. The sensor assembly 302 outputs image-based measurements that can be utilized as a basis for friction estimation. The sensor assembly 302 can be utilized as the sensors 102 of the friction estimation system 100, to provide some or all of the signals 104 that are utilized by the parameter determination unit 106.

The sensor assembly 302 is operable to measure properties of a scene 312. The scene 312 is a portion of the environment near the sensor assembly 302. As an example, if the sensor assembly 302 is installed in a vehicle, the scene 312 may be or include a portion of a roadway that the vehicle is travelling on.

The sensor assembly 302 includes an NIR light source 314, an NIR imaging device 316*a*, and an LWIR imaging device 318*a*. The NIR imaging device 316 includes an NIR image sensor 320 and an NIR filter 322. The LWIR imaging device 318 includes an LWIR image sensor 324 and an LWIR filter 326.

The NIR light source 314 is operable to emit broad spectrum infrared radiation including radiation at wavelengths of 905 nm 1310 nm. The infrared radiation emitted by the NIR light source 314 is detectable by the NIR imaging device 316.

The NIR image sensor 320 is operable to output a series of raster images (e.g. video frames) that represent infrared radiation from the scene 312 that is incident on the NIR image sensor 320. The NIR image sensor 320 may be any type of image sensing device that is sensitive to light in the near-infrared spectrum. As one example, the NIR image sensor 320 may be an indium gallium arsenide (InGaAs) sensor. Other types of sensors that are sensitive to the wavelength bands being measured may be used.

The NIR filter 322 is bandpass filter array having filter elements that are arranged in a pattern. The pattern can be a checkerboard pattern, similar to that in a Bayer filter, an alternating row pattern, or an alternating column pattern. The filter elements include a first group of filter elements that pass electromagnetic radiation in the first NIR wavelength band and block other wavelengths, and a second group of filter elements that pass electromagnetic radiation in the second NIR wavelength band and block other wavelengths. The filter elements from the first group of filter elements pass electromagnetic radiation in the first NIR wavelength band to a first group of sensor elements of the NIR image sensor 320 and the filter elements from the second group of filter elements pass electromagnetic radiation in the second NIR wavelength band to a second group of sensor elements of the NIR image sensor 320. The output signal from the NIR image sensor 320 can be interpreted to separate the signals from the first group of sensor elements and the second group of sensor elements into first and second NIR signals representing electromagnetic radiation in the first NIR wavelength band and the second NIR wavelength band, respectively.

The LWIR image sensor 324 is operable to output a series of raster images (e.g. video frames) that represent longwave infrared radiation from the scene 312 that is incident on the LWIR image sensor 324. The LWIR image sensor 324 may be any type of image sensing device that is sensitive to light in the LWIR spectrum. As example, the LWIR image sensor 324 may be a mercury-cadmium-telluride based sensor, multiple-quantum-well superlattice structure based detector, or a strained-layer superlattice structures based detector. Other types of sensors that are sensitive to the wavelength bands being measured may be used.

The LWIR filter 326 is bandpass filter array having filter elements that are arranged in a pattern. The pattern can be a checkerboard pattern, similar to that in a Bayer filter, an alternating row pattern, or an alternating column pattern. The filter elements include a first group of filter elements that pass electromagnetic radiation in the first LWIR wavelength band and block other wavelengths, and a second group of filter elements that pass electromagnetic radiation in the second LWIR wavelength band and block other wavelengths. The filter elements from the first group of filter elements pass electromagnetic radiation in the first LWIR wavelength band to a first group of sensor elements of the LWIR image sensor 324 and the filter elements from the second group of filter elements pass electromagnetic radiation in the second LWIR wavelength band to a second group of sensor elements of the LWIR image sensor 324. The output signal from the LWIR image sensor 324 can be interpreted to separate the signals from the first group of sensor elements and the second group of sensor elements into first and second LWIR signals representing electromagnetic radiation in the first LWIR wavelength band and the second LWIR wavelength band, respectively.

Figure 4:
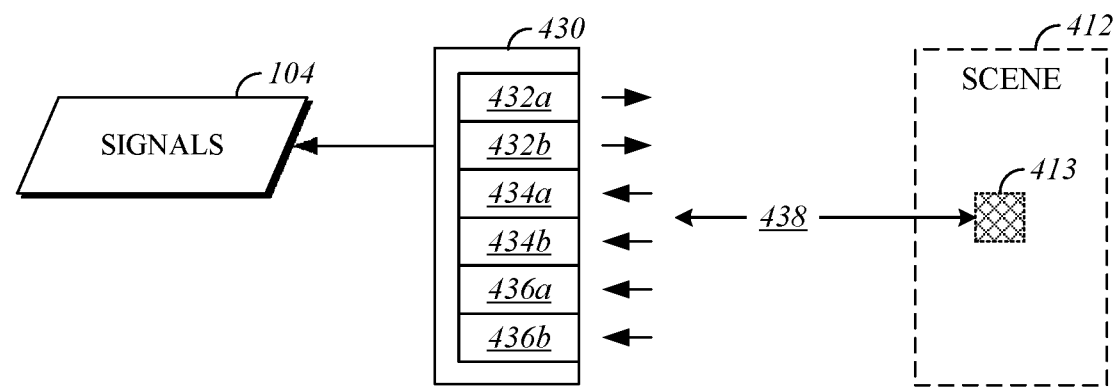
FIG. 4 is a block diagram that shows an example of a sensor group that can be utilized to take point-based measurements.

FIG. 4 is a block diagram that shows an example of a sensor group 430 that can be utilized to take point-based measurements as opposed to image-based measurements as described with respect to the sensor assembly 202 and the sensor assembly 302.

The sensor group 430 includes a first laser source 432a, a second laser source 432b, a first optical intensity detector 434a, a second optical intensity detector 434b, a first pyrometer 436a, and a second pyrometer 436b. The sensor group 430 is operable to measure properties of a scene 412. The scene 412 is a portion of the environment near the sensor group 430. As an example, if the sensor group 430 is installed in a vehicle, the scene 412 may be or include a portion of a roadway that the vehicle is travelling on.

The first laser source 432a, the second laser source 432b, the first optical intensity detector 434a, the second optical intensity detector 434b, the first pyrometer 436a, and the second pyrometer 436b are oriented to send or receive signals along a sensor axis 438. The orientation of the sensor axis 438 corresponds to an area 413 within the scene 412. As will be explained herein, mechanical or optical systems can be used to change the orientation of the sensor axis 438, such as by sweeping, to measure a number of different discrete areas within the scene 412.

The first laser source 432a emits a laser beam having a wavelength within the first NIR wavelength band. The second laser source 432b emits a laser beam having a wavelength within the second NIR wavelength band. The first optical intensity detector 434a is sensitive to electromagnetic radiation in the first NIR wavelength band and outputs a signal that corresponds returned radiation from the first laser source 432a. The second optical intensity detector 434b is sensitive to electromagnetic radiation in the second NIR wavelength band and outputs a signal that corresponds returned radiation from the second laser source 432b.

The first pyrometer 436a and the second pyrometer 436b measure temperature at different wavelengths, such as by including band pass filters or notch filters. For example, the measurement made by the first pyrometer 436a can be in the first LWIR wavelength band and the measurement made by the second pyrometer 436b can be made in the second LWIR wavelength band.

Figure 5:
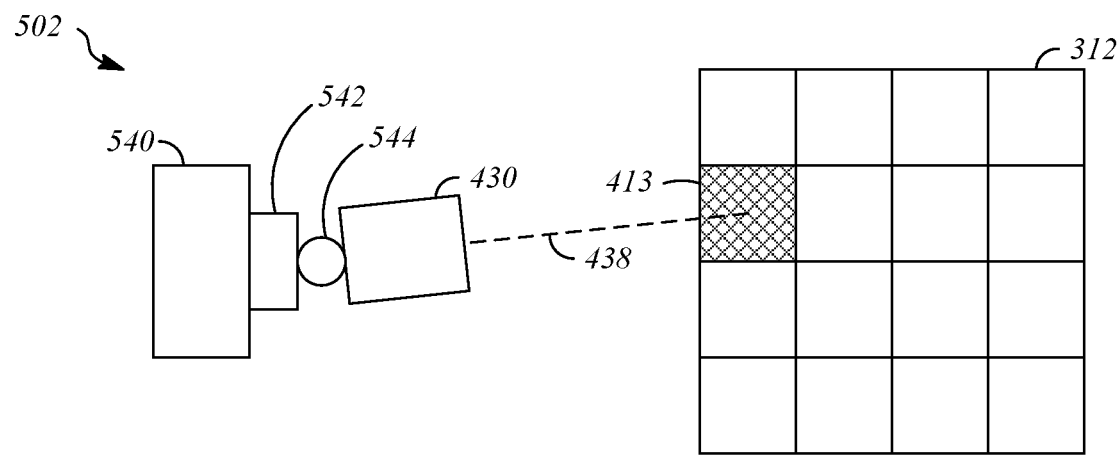
FIG. 5 is a top view illustration that shows a sensor assembly that includes the sensor group.

FIG. 5 is a top view illustration that shows a sensor assembly 502 that includes the sensor group 430. The sensor group 430 is supported with respect to a structure 540. The structure 540 may be a mobile structure, such as a vehicle. The sensor assembly 502 is connected to the structure 540 by an aiming mechanism that includes a first stage 542 and a second stage 544. The aiming mechanism is a mechanical aiming mechanism that is able to adjust an angle of the sensor axis 438 relative to the structure 540 to allow the sensor group 430 to obtain measurements of multiple areas of the scene 312. For example, the first stage 542 and the second stage 544 may include rotating joints and motors that can be controlled to drive the rotating joints to desired positions.

In the illustrated example, the sensor group 430 is aimed at the area 413. The first stage 542 is configured to rotate the sensor group 430 around a first axis, which in this is example is substantially horizontal, to change the distance at which measurements are taken to measure areas that are closer to or further away from the structure 540. The second stage is configured to rotate the sensor group 430 around a second axis, which in this is example is substantially vertical, to sweep the sensor axis 438 laterally across the scene 312. The first stage 542 and the second stage 544 can cooperate to move the sensor group 430 so that multiple areas of the scene 312 can be measured.

Figure 6:
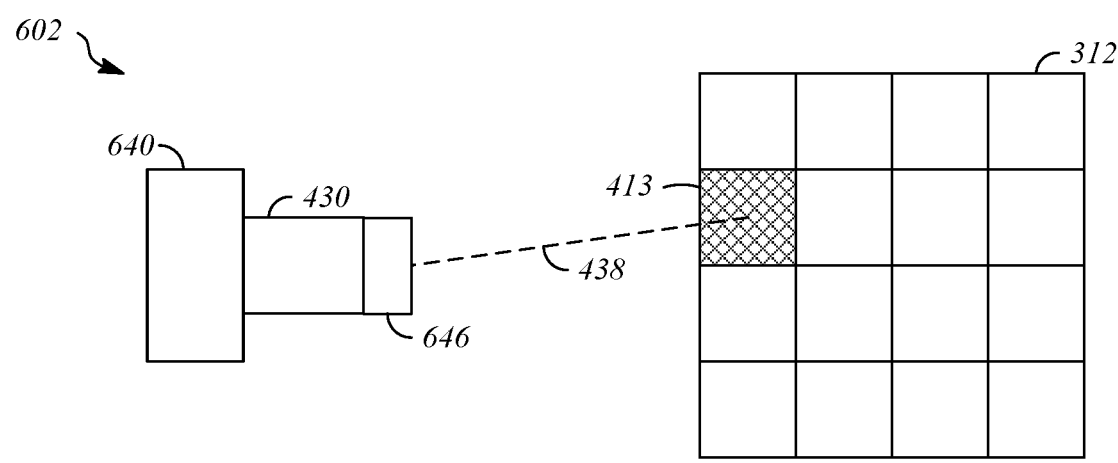
FIG. 6 is a top view illustration that shows a sensor assembly that includes the sensor group.

FIG. 6 is a top view illustration that shows a sensor assembly 602 that includes the sensor group 430. The sensor group 430 is supported by a structure 640 at a fixed position with respect to the structure 640. The structure 640 may be a mobile structure, such as a vehicle. The sensor assembly 602. An aiming mechanism 646 is connected to the sensor group 430. The aiming mechanism is an optical aiming mechanism that is operable to adjust an angle of the sensor axis 438 relative to the structure 640 to allow the sensor group 430 to obtain measurements of multiple areas of the scene 312. As an example, the aiming mechanism 646 can include one or more adjustable optical elements such as lenses or mirrors that can be translated or rotated in a manner that changes the angle of the sensor axis 438 in two rotational dimensions to allow sweeping of the sensor group 430 laterally and longitudinally (i.e., toward and away) with respect to the structure 640 to allow measurements to be taken of multiple areas in the scene 312.

Figure 7:
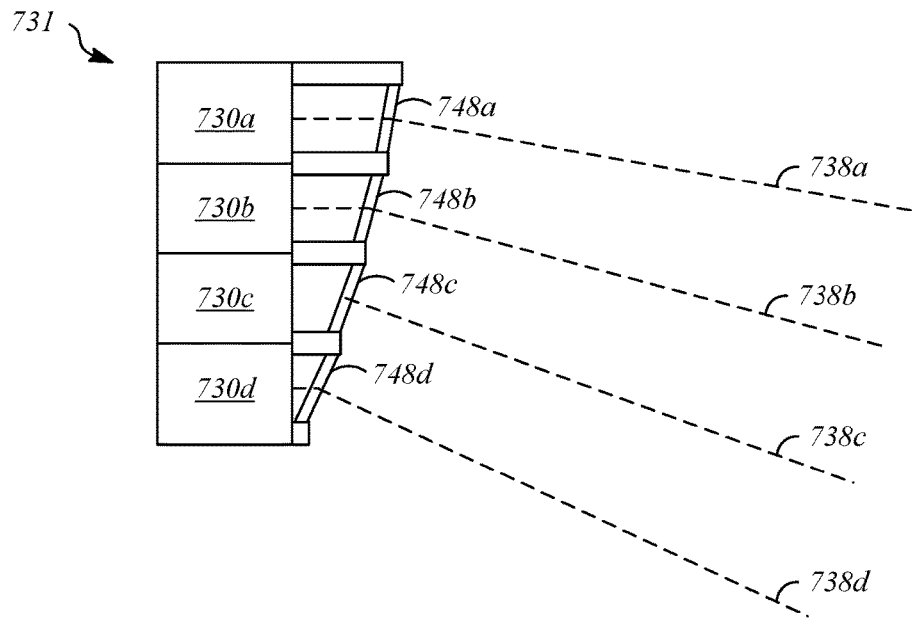
FIG. 7 is a side view illustration that shows a sensor module that includes multiple sensor groups.

FIG. 7 is a side view illustration that shows a sensor module 731 that includes multiple sensor groups including a first sensor group 730a, a second sensor group 730b, a third sensor group 730c, and a fourth sensor group 730d, each of which are configured in the manner described with respect to the sensor group 430. The first sensor group 730a is associated with a first lens assembly 748a that orients emission and receipt of signals along a first sensor axis 738a. The second sensor group 730b is associated with a second lens assembly 748b that orients emission and receipt of signals along a second sensor axis 738b. The third sensor group 730c is associated with a third lens assembly 748c that orients emission and receipt of signals along a third sensor axis 738c. The fourth sensor group 730d is associated with a fourth lens assembly 748d that orients emission and receipt of signals along a fourth sensor axis 738d. In the illustrated example, the first sensor axis 738a, the second sensor axis 738b, the third sensor axis 738c, and the fourth sensor axis 738d have a common lateral orientation and vary in angle elevationally such that each meets a ground plane (e.g. roadway) at a different longitudinal distance ahead of the sensor module 731. The angles can be selected such that the distances between locations where the sensor axes strike a ground plane are consistent. In an alternative example, the elevational orientations are consistent and the first sensor axis 738a, the second sensor axis 738b, the third sensor axis 738c, and the fourth sensor axis 738d vary in lateral orientations, such as by being spaced by equal angles, such that the sensor axes strike a ground plane ahead at a common distance ahead of the sensor module 731 but at spaced lateral locations.

Figure 8:
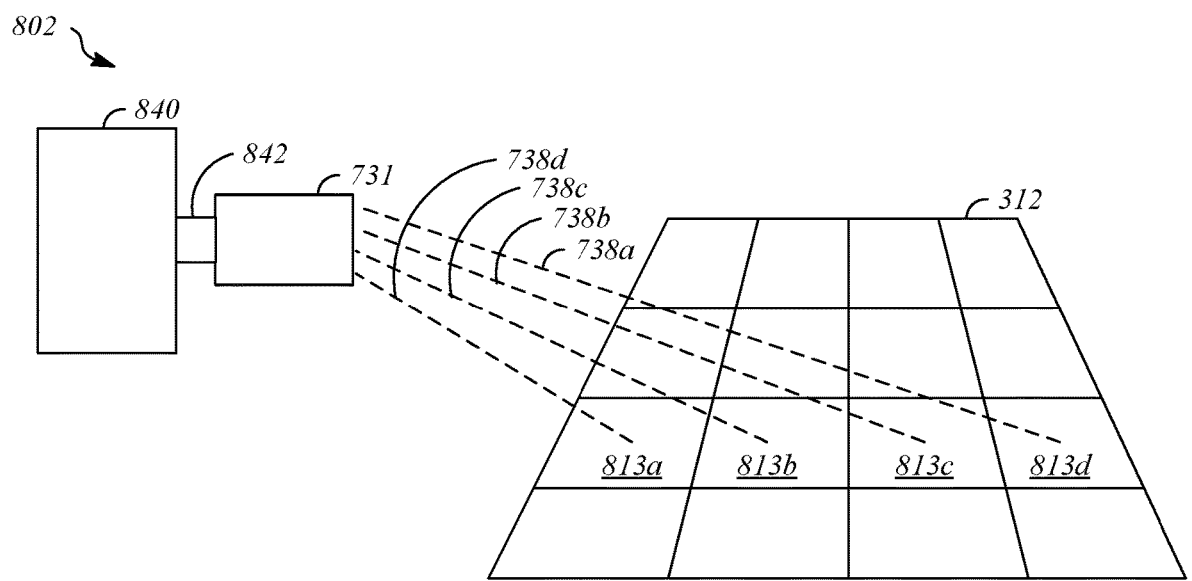
FIG. 8 is a perspective view illustration that shows a sensor assembly that includes the sensor module.

FIG. 8 is a perspective view illustration that shows a sensor assembly 802 that includes the sensor module 731. The sensor module 731 is supported with respect to a structure 840. The structure 840 may be a mobile structure, such as a vehicle. The sensor assembly 802 is connected to the structure 840 by an aiming mechanism that includes a first stage 842 that is able to adjust an angle of the sensor axes including the first sensor axis 738a, the second sensor axis 738b, the third sensor axis 738c, and the fourth sensor axis 738d relative to the structure 840. The aiming mechanism is a mechanical aiming mechanism, but an optical aiming mechanism could be used as an alternative. At each angular position, the sensor module 731 measures multiple areas of the scene 312, such as a first area 813a, a second area 813b, a third area 813c, and a fourth area 813d, which are longitudinally aligned in the illustrated example. The first stage 842 rotates the sensor group 430 around a first axis, which in this is example is substantially vertical, to change the lateral position at which measurements are taken to measure areas to the left and right as compared to the first area 413a, a second area 413b, a third area 413c, and a fourth area 413d, such as by sweeping back and forth. In implementations where the sensor module 731 has longitudinally aligned sensor axes that are spread laterally, the sensor module is rotated elevationally, such as by sweeping up and down, to change the longitudinal distance at which measurements are taken.

Figure 9:
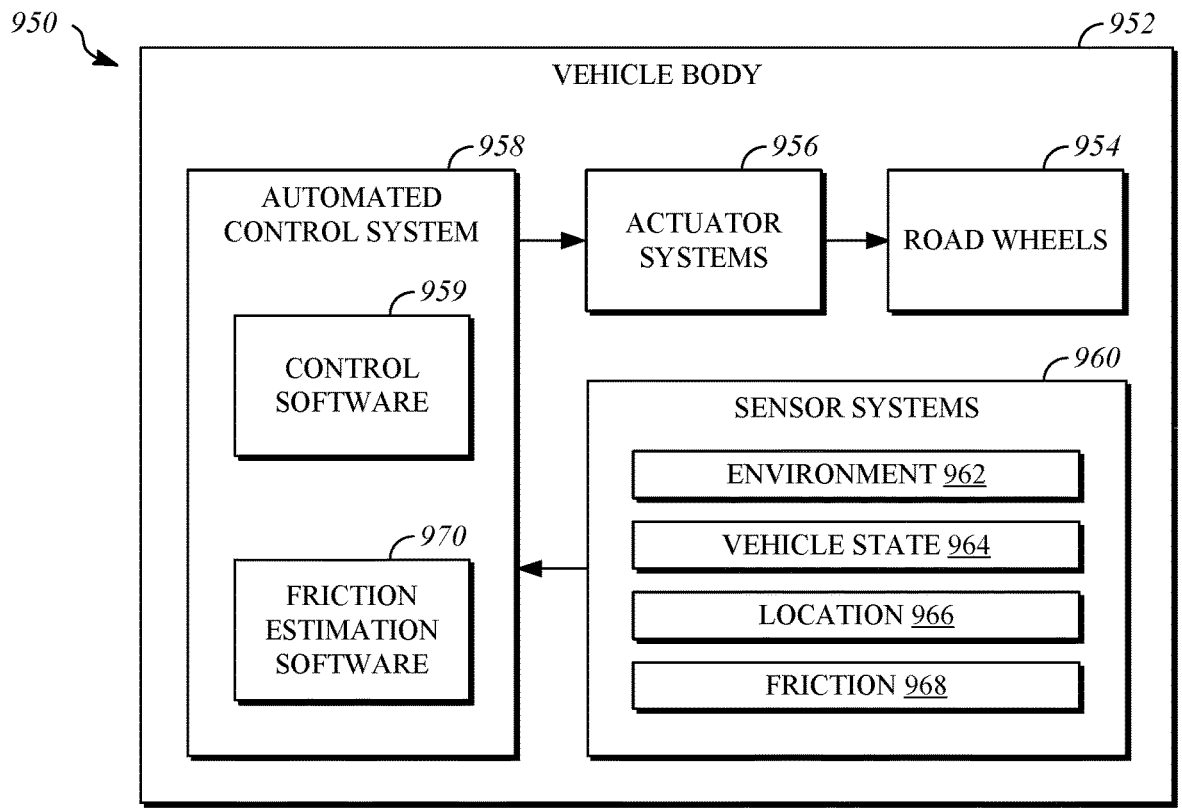
FIG. 9 is a block diagram that shows a vehicle.

FIG. 9 is a block diagram that shows a vehicle 950. The vehicle 950 is a wheeled vehicle that has a vehicle body 952, road wheels 954, actuator systems 956, an automated control system 958, and sensor systems 960. It should be understood that the systems described herein could also be implemented in apparatuses other than wheeled vehicles. As one example, the systems described herein could be implemented in low-flying aircraft such as a helicopter or a drone (i.e., small autonomous, semi-autonomous, or remote controlled aircraft, such as fixed wing or multi-rotor aircraft) as part of a remote sensing application, and information obtained could be transmitted to other systems for use, such as to the vehicle 950.

The vehicle body 952 may include internal structural portions and external portions that are aesthetic and/or structural in nature. As examples, the vehicle body 952 may include one or more of a unibody, a frame, a subframe, a monocoque, and body panels.

The road wheels 954 are the portion of the vehicle 950 that contacts the surface on which the vehicle 950 is travelling. The characteristics of the road wheels 954 are responsible, in part, for the amount of friction available at a tire-road interface. The road wheels 954 may include tires, such as conventional pneumatic tires formed in part from synthetic rubber, or other friction-enhancing structures may be incorporated in the road wheels 954. The vehicle 950 may include four of the road wheels 954, but other implementations are possible.

The actuator systems 956 are operable to cause and control motion of the vehicle 950. Any type and combination of vehicle actuators may be utilized as the actuator systems 956, including actuators traditionally associated with road-going vehicles and off-road vehicles.

The actuator systems 956 may include suspension actuators that are operable to control characteristics of the motion of the road wheels 954 relative to the vehicle body 952, such as shocks, struts, springs, and sway bars, and may be active components or passive components. The actuator systems 956 may include steering components that are operable to modify a steering angle of some or all of the road wheels 954 relative to the vehicle body 952 in response to control signals, such as a conventional rack and pinion arrangement. The actuator systems 956 may include braking components that are operable to slow the speeds of the road wheels 954, such as a conventional disk braking system. The actuator systems 956 may include propulsion components (i.e., a powertrain) that are operable to convert stored energy into driving force, and components that are operable to supply this force to some or all of the road wheels 954 in order to propel the vehicle 950. Examples of propulsion components include an internal combustion engine that burns liquid fuel and an electric motor that utilizes electrical energy that is stored in batteries or is supplied by a generator.

The actuator systems 956 operate in response to control signals from the automated control system 958. The automated control system 958 is configured to output the control signals using data that is received from sensor systems 960 and optionally from other sources to implement automated control of the vehicle 950. As will be explained herein, the automated control system 958 can implement motion planning functions that determine a trajectory for the vehicle 950, and actuator control functions that coordinate operation of the actuator systems 956 to attempt to follow the trajectory. The decision making functions of the automated control system 958 are implemented using control software 959 that is operable to cause autonomous operation of the vehicle 950, as will be described further herein. Friction estimation functions of the automated control system 958 are implemented using friction estimation software 970. The functions of the friction estimation software may be implemented as described with respect to the parameter determination unit 106 and the friction estimation unit 110, and as further described herein. The control software 959 and the friction estimation software 970 may be implemented using a conventional computing device that is provided in the form of computer executable instructions, in the form of specialized hardware such as an application-specific integrated circuit (ASIC) or a field-programmable gate array (FPGA), or a combination of conventional computing devices and/or specialized hardware.

The decision making functions of the automated control system 958 utilize inputs from sensor systems 960. The sensor systems 960 can provide the automated control system 958 with information derived from sources that are inside and outside the vehicle 950. In addition, the sensor systems can collect information from the components of the sensor systems 960 and distribute that information to the automated control system and to other systems of the vehicle 950.

In the illustrated example, the sensor systems include environment sensors 962, vehicle state sensors 964, location sensors 966, and friction estimation sensors 968. These components of the sensor systems 960 are examples, and other types of sensors can be provided to generate inputs that are used by the automated control system 958 and/or other vehicle systems.

The environment sensors 962 are operable to provide information that describes characteristics of the environment in which the vehicle 950 is travelling. Various types of individual sensors can be included in the environment sensors 962. As one example, the environment sensors 962 can include range sensors such as ultrasonic, radar, and LIDAR sensors that are able to generate information that describes the distance from the sensor to objects in the environment surrounding the sensor. As another example, the environment sensors 962 can include video cameras that capture images of the environment outside of the vehicle 950, such as visible-spectrum cameras, or infrared cameras.

The vehicle state sensors 964 are operable to provide information that describes operation of the vehicle 950, including information that describes kinematic states of the vehicle 950 and information that describes operation of various components of the vehicle 950. As one example, vehicle operating states can be reported by sensors that are associated with actuators from the actuator system 956, such as wheel speed sensors. As another example, the vehicle state sensors can provide information that describes motion of the vehicle 950, such as inertial measurement units that provide information from which position, velocity, rotation, acceleration, and other parameters can be determined.

The location sensors 966 are operable to receive information describing the spatial location of the vehicle 950, for example, in terms of latitude and longitude coordinates. The information provided by the location sensors can support navigation functions and motion control functions that are used by or implemented by the automated control system 958. The location sensors 966 can include, for example, a satellite positioning receiver (e.g., GPS).

The friction estimation sensors 968 provide signals that can be used for estimating friction. The friction estimation sensors 968 may be dedicated sensors that are used only for friction estimation, or may include components that are part of other ones of the sensor systems 960. The friction estimation sensors 968 may include sensors described in connection with the sensors 102 of FIG. 1, the sensor assembly 202 of FIG. 2, the sensor assembly 302 of FIG. 3, the sensor group 430 of FIG. 4, the sensor assembly 502 of FIG. 5, the sensor assembly 602 of FIG. 6, the sensor assembly 802 of FIG. 8, or other sensor assemblies that provide output signals that are suitable for use in friction estimation. For example, sensors related to tire forces or suspension forces could be used to calibrate or confirm measurements obtained using the previously-described sensor assemblies.

Figure 10:
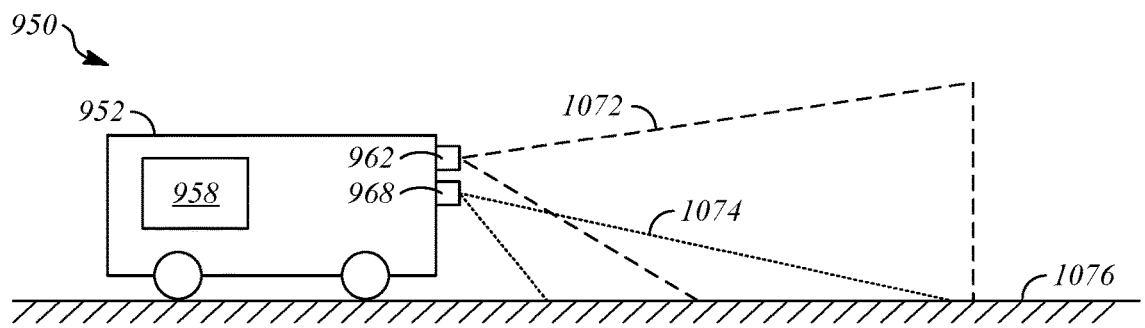
FIG. 10 is an illustration that shows the vehicle and a roadway.

FIG. 10 is an illustration that shows the vehicle 950. The vehicle 950 implements tire-road friction estimation as described with respect to the friction estimation system 100. The environment sensors 962 have a first field of view 1072 and the friction estimation sensors 968 have a second field of view 1074. The first field of view 1072 and the second field of view 1074 each include a portion of a roadway 1076 ahead of the vehicle 950. The first field of view 1072 and the second field of view 1074 may be overlapping. Thus, the environment sensors 962 and the friction estimation sensors 968 are operable to provide information representing characteristics and features of the roadway 1076 to the automated control system 958.

Figure 11:
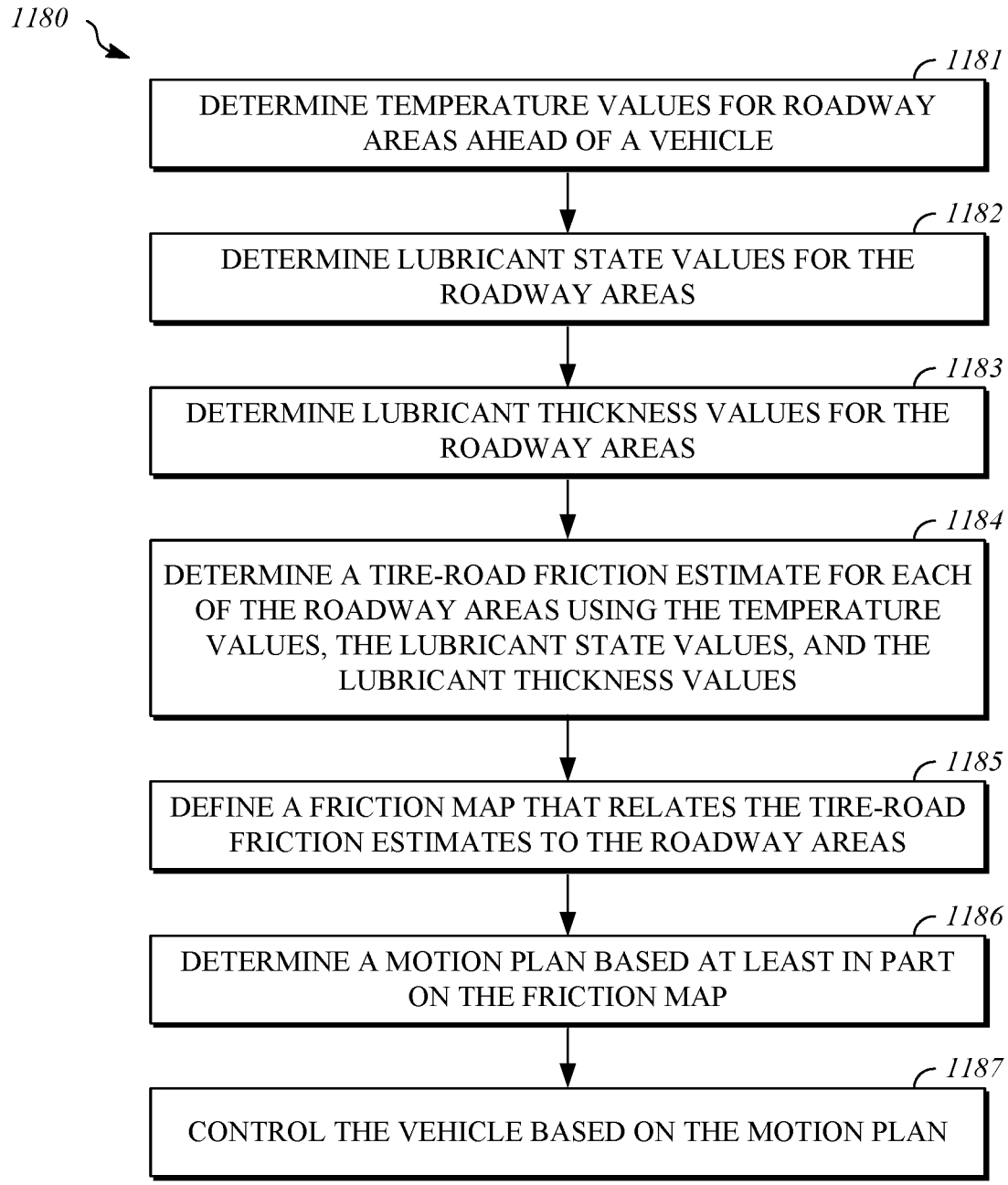
FIG. 11 is a flowchart that shows an example of a process for friction estimation.

FIG. 11 is a flowchart that shows a first example of a process 1180 for friction estimation. The process 1180 can be performed using, as examples, the friction estimation system 100 or the vehicle 950. Operations of the process can be caused, controlled, or performed by a computing device, such as the automated control system 958 of the vehicle 950, which is provided with instructions that are stored in a storage device or a memory device, and a processor that is operable to execute the program instructions. When executed by the processor, the program instructions cause the computing device to perform the operations of the process 1180 as described herein.

Some operations described herein include determining values. Determining can be performed, as examples, by using a sensor to measure a value, by receiving a value from another system, or by calculating the value based on other information. Determining values can also include, in some implementations, ruling out a value as a contributor to friction estimation, for example, when presence of lubricant is not detectable and therefore the lubricant value is zero, its use in further friction estimation operations may be ruled out, and this circumstance would be considered determining a lubricant thickness value.

In operation 1181, temperature values for roadway areas ahead of a vehicle are determined. In some implementations, determining temperature values for the roadway areas includes obtaining infrared temperature measurements for the roadway areas. The infrared temperature measurements can be obtained with a sensor. The output signal from the sensor is interpreted to determine the temperature values, such as by applying a conversion factor and/or a calibration factor. Operation 1181 can be performed, for example, in the manner described with respect to the parameter determination unit 106 using the signals 104, such as one or both of the first NIR signal 105c and the second NIR signal 105d.

In operation 1182, lubricant state values for the roadway areas are determined. In some implementations, determining lubricant state values is performed by determining emissivity values for the roadway areas and comparing the emissivity values for the roadway areas to known emissivity values for common lubricants at various states. As an example, the lubricant state values can be determined based on emissivity values in the manner described with respect to the parameter determination unit 106. As previously discussed with respect to the parameter determination unit 106, emissivity values for the roadway areas may be determined using long wave infrared signals. The long wave infrared signals can be obtained from sensors, as previously described, and sensor output signals may be interpreted using a conversion factor and/or a calibration factor.

In operation 1183, lubricant thickness values for the roadway areas are determined. As an example, determining lubricant thickness values for the roadway areas may be performed by differential spectroscopy using near infrared signals. For example, the lubricant thickness values may be determined in the manner described with respect to the parameter determination unit 106. The near infrared signals can be obtained from sensors, as previously described, and sensor output signals may be interpreted using a conversion factor and/or a calibration factor.

In operation 1184, a tire-road friction estimate is determined for each of the roadway areas using the temperature values, the lubricant state values, and the lubricant thickness values. The tire road friction estimate may be determined in the manner described with respect to the friction estimation unit 110. As an example, determining the tire-road friction estimate for each of the roadway areas may be performed using a machine-learning model that was previously trained using ground truth information that describes sets of friction-related parameters and corresponding tire-road friction values.

Additional signals can be utilized for determining the tire-road friction estimate for each of the roadway areas in operation 1184. A lubricant composition value can be determined for each of the roadway areas based on reflectance, and the tire-road friction estimate for each of the roadway areas can be determined using the lubricant composition value as an additional signal. A surface roughness value for each of the roadway areas can be determined for each of the roadway areas using a structured light signal the tire-road friction estimate for each of the roadway areas can be determined using the surface roughness value as an additional signal. Feasible lubricant compositions and temperatures can also be determined, such as by using satellite positioning signals giving latitude and longitude to identify feasible lubricant compositions based on temperatures, such as by ruling out ice or slush for certain geographic coordinates, optionally further based on time of year, and optionally further based on weather report information received from an external data source. A humidity value can be determined. The humidity value is applicable to all roadway areas and the tire-road friction estimate for each of the roadway areas can be determined using the humidity value as an additional signal.

In operation 1185, a friction map is defined. The friction map relates the tire-road friction estimates to the roadway areas. The friction map may be defined in the manner described with respect to the friction map 101b of the friction estimation system 100.

In operation 1186, a motion plan is determined based at least in part on the friction map. The friction map may be used as an input to an automated control system that determines the motion plan, such as the automated control system 958 of the vehicle 950. The friction estimates from the friction map can be utilized by the automated control system 958, for example, to determine vehicle handling limits at various locations along the roadway. The friction estimates can be used to select a motion plan (e.g., in a cost function) or information based on the friction estimates, such as the friction-based vehicle handling limits, can be used to select a motion plan.

In one example, determining the motion plan includes determining a first candidate motion plan that traverses a first group of the roadway areas, determining a second candidate motion plan that traverses a second group of the roadway areas, and selecting one of the first candidate motion plan or the second candidate motion plan as the motion plan based in part on the tire-road friction estimates for the roadway areas from the first group of the roadway areas and the tire-road friction estimates for the roadway areas from the second group of the roadway areas.

In operation 1187, the vehicle is controlled based on the motion plan. The process 1180 can be repeated to continuously update the friction map during operation of the vehicle.

Figure 12:
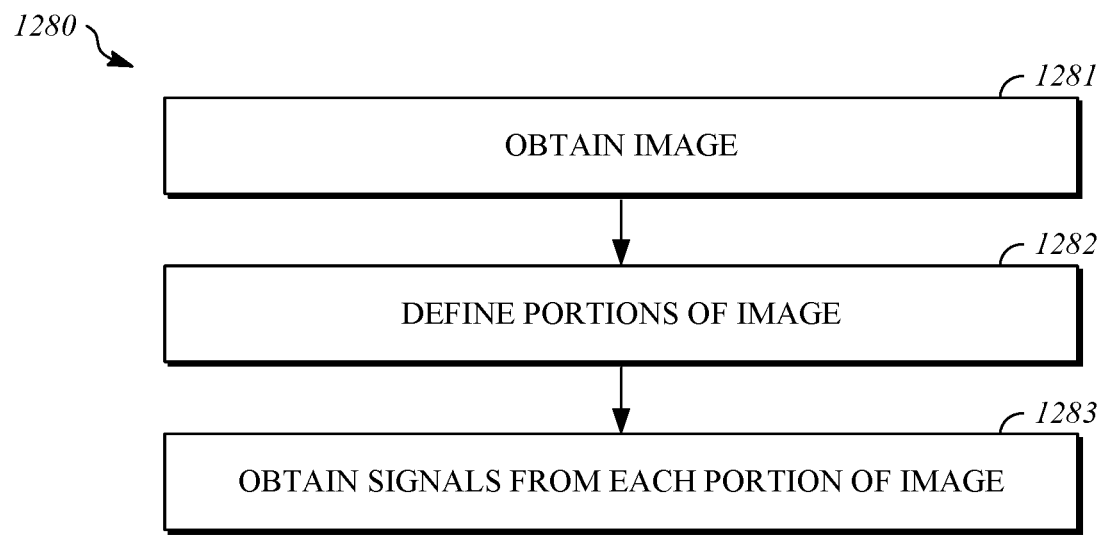
FIG. 12 is a flowchart that shows a first example of a process for obtaining signals that are useful for friction estimation.

FIG. 12 is a flowchart that shows a first example of a process 1280 for obtaining signals that are useful for friction estimation. As an example, the signals obtained by execution of the process 1280 can be utilized as a basis for the determinations made in operations 1181, 1182, and 1183 in the process 1180 of FIG. 11. The process 1280 can be performed using, as examples, the friction estimation system 100 or the vehicle 950. Operations of the process can be caused, controlled, or performed by a computing device, such as the automated control system 958 of the vehicle 950, which is provided with instructions that are stored in a storage device or a memory device, and a processor that is operable to execute the program instructions. When executed by the processor, the program instructions cause the computing device to perform the operations of the process 1280 as described herein.

The process 1280 is performed using sensors that output raster images that represent NIR and LWIR signals. In operation 1281, an image is obtained. The image obtained in operation 1281 can be an NIR image or an LWIR image. The image can be obtained, for example, as discussed with respect to the sensor assembly 202 and the sensor assembly 302. Operation 1282 includes defining portions of the image, such as by dividing the image into rectangular, square, or irregular sections. For example, the image could be segmented into areas having similar properties. Operation 1283 includes obtaining the signals from each portion of the image. As an example, the signals can be obtained by averaging information in each portion of the image. The process 1280 is performed repeatedly for each image used as an input for each frame of the image as it is received.

Figure 13:
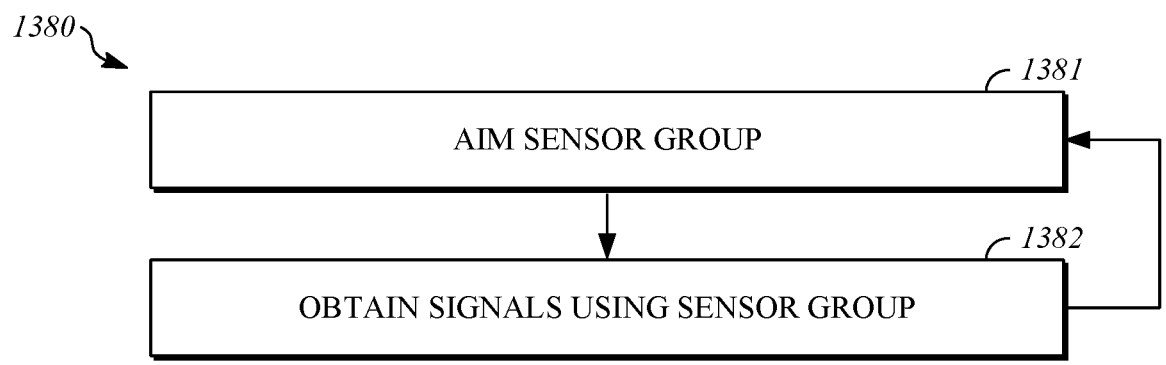
FIG. 13 is a flowchart that shows a second example of a process for obtaining signals that are useful for friction estimation.

FIG. 13 is a flowchart that shows a second example of a process 1380 for obtaining signals that are useful for friction estimation. As an example, the signals obtained by execution of the process 1280 can be utilized as a basis for the determinations made in operations 1181, 1182, and 1183 in the process 1180 of FIG. 11. The process 1380 can be performed using, as examples, the friction estimation system 100 or the vehicle 950. Operations of the process can be caused, controlled, or performed by a computing device, such as the automated control system 958 of the vehicle 950, which is provided with instructions that are stored in a storage device or a memory device, and a processor that is operable to execute the program instructions. When executed by the processor, the program instructions cause the computing device to perform the operations of the process 1380 as described herein.

The process 1380 is performed using sensors that output information on a point-by-point basis, such as the sensor group 430 of FIG. 4. In operation 1381, the sensor group is aimed at a portion of an environment, such as a roadway. The sensor group is aimed by changing the orientation of a sensor axis along which measurements are taken. In operation 1382, signals are obtained from the sensor group. The process then returns to operation 1381. Over the course of multiple iterations, the sensor group is repeatedly moved, such as in a pattern. A sweeping pattern may be used, or any other pattern may be used.

Figure 14:
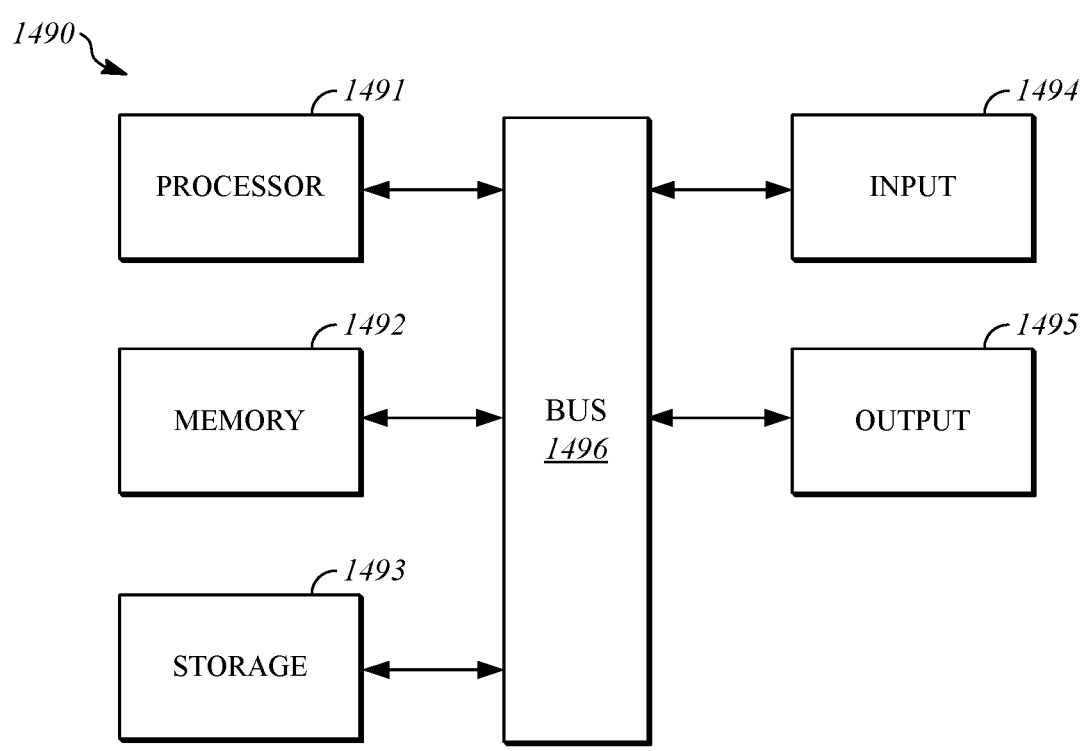
FIG. 14 is an illustration that shows an example of a hardware configuration of a computing device.

FIG. 14 is an illustration that shows an example of a hardware configuration of a computing device 1490 that can be utilized to implement portions of the friction estimation system 100, such as the functions described with respect to the parameter determination unit 106 and the friction estimation unit 110, or the automated control system 958.

The computing device 1490 may include a processor 1491, a memory 1492, a storage device 1493, one or more input devices 1494, and one or more output devices 1495. The computing device 1490 may include a bus 1496 or a similar device to interconnect the components for communication. The processor 1491 is operable to execute computer program instructions and perform operations described by the computer program instructions. As an example, the processor 1491 may be a conventional device such as a central processing unit. The memory 1492 may be a volatile, high-speed, short-term information storage device such as a random-access memory module. The storage device 1493 may be a non-volatile information storage device such as a hard drive or a solid-state drive. The input devices 1494 may include any type of human-machine interface such as buttons, switches, a keyboard, a mouse, a touchscreen input device, a gestural input device, or an audio input device. The output devices 1495 may include any type of device operable to provide an indication to a user regarding an operating state, such as a display screen or an audio output.

What is claimed is:
1. A method, comprising:
obtaining images using sensors of a vehicle, wherein the images show a roadway that is located ahead of the vehicle;
dividing the images into image sections that correspond to a plurality of roadway areas from the roadway;

determining temperature values for the plurality of roadway areas using respective ones of the image sections from the images obtained by the sensors;
determining lubricant state values for the plurality of roadway areas using respective ones of the image sections from the images obtained by the sensors;
determining lubricant thickness values for the plurality of roadway areas using respective ones of the image sections from the images obtained by the sensors;
determining tire-road friction estimates for the plurality of roadway areas using the temperature values, the lubricant state values, and the lubricant thickness values;
determining a trajectory for the vehicle using the tire-road friction estimates for the plurality of roadway areas, wherein the trajectory traverses at least some roadway areas from the plurality of roadway areas; and
controlling actuator systems of the vehicle such that the vehicle follows the trajectory.

2. The method of claim 1, wherein determining the temperature values for the plurality of roadway areas includes obtaining infrared temperature measurements for the plurality of roadway areas.

3. The method of claim 1, wherein determining the lubricant state values is performed by determining emissivity values for the plurality of roadway areas and comparing the emissivity values for the plurality of roadway areas to known emissivity values.

4. The method of claim 3, wherein determining the emissivity values for the plurality of roadway areas is performed using long wave infrared (LWIR) signals.

5. The method of claim 1, wherein determining the lubricant thickness values for the plurality of roadway areas is performed by differential spectroscopy using near infrared (NIR) signals.

6. The method of claim 1, further comprising:
determining lubricant composition values for the plurality of roadway areas, wherein the lubricant composition values are determined based on reflectance and determining the tire-road friction estimates for the plurality of roadway areas is performed using the lubricant composition values.

7. The method of claim 1, further comprising:
determining surface roughness values for the plurality of roadway areas, wherein the surface roughness values for the plurality of roadway areas are determined using a structured light signal and determining the tire-road friction estimates is performed using the surface roughness values.

8. The method of claim 1, further comprising:
determining a humidity value, wherein determining the tire-road friction estimates is performed using the humidity value.

9. The method of claim 1, wherein determining the trajectory includes:
determining a first candidate trajectory that traverses a first group of roadway areas from the plurality of roadway areas,
determining a second candidate trajectory that traverses a second group of roadway areas from the plurality of roadway areas, and
selecting one of the first candidate trajectory or the second candidate motion trajectory as the trajectory based in part on the tire-road friction estimates for the first group of roadway areas and the tire-road friction estimates for the second group of roadway areas.

10. The method of claim 1, wherein the lubricant state values each correspond to at least one of a liquid state, a semi-solid state, or a solid state.

11. The method of claim 1, wherein determining the trajectory for the vehicle includes determining vehicle handling limits for the plurality of roadway areas based on the tire-road friction estimates for the plurality of roadway areas.

12. The method of claim 1, wherein the emissivity values for the plurality of roadway areas are determined using long wave infrared (LWIR) signals from the images, the lubricant thickness values for the plurality of roadway areas are determined by differential spectroscopy using near infrared (NIR) signals from the images, the lubricant composition values for the plurality of roadway areas are determined using the images based on reflectance.

13. A system, comprising:
a sensor group that is mounted to a vehicle and includes:
one or more near infrared (NIR) light sources that output electromagnetic radiation in at least a first NIR wavelength band and a second NIR wavelength band,
a first NIR camera that is sensitive to electromagnetic radiation in the first NIR wavelength band and outputs a first NIR raster image representing a roadway ahead of the vehicle,
a second NIR camera that is sensitive to electromagnetic radiation in the second NIR wavelength band and outputs a second NIR raster image representing the roadway ahead of the vehicle,
a first long wave infrared (LWIR) camera that is sensitive to electromagnetic radiation in a first LWIR wavelength band and outputs a first LWIR raster image representing the roadway ahead of the vehicle, and
a second LWIR camera that is sensitive to electromagnetic radiation in a second LWIR wavelength band and outputs a second LWIR raster image representing the roadway ahead of the vehicle; and
a friction estimation unit that defines image portions corresponding to a plurality of roadway areas of each of the first NIR raster image, the second NIR raster image, the first LWIR raster image, and the second LWIR raster image, and determines tire-road friction estimates for the plurality of roadway areas using corresponding ones of the image portions.

14. The system of claim 13, wherein the friction estimation unit determines temperature values for the plurality of roadway areas using at least one of the first NIR raster image or the second NIR raster image, the friction estimation unit determines lubricant state values for the plurality of roadway areas using the first LWIR raster image and the second LWIR raster image, the friction estimation unit determines lubricant thickness values for the plurality of roadway areas using the first NIR raster image and the second NIR raster image, and the friction estimation unit determines the tire-road friction estimates the plurality of roadway areas based on the temperature values, the lubricant state values, and the lubricant thickness values.

15. The system of claim 13, wherein the one or more NIR light sources include a single NIR light source that outputs electromagnetic radiation in the first NIR wavelength band and the second NIR wavelength band.

16. The system of claim 13, wherein the one or more NIR light sources include a first NIR light source that outputs electromagnetic radiation only in the first NIR wavelength band and a second NIR light source that outputs electromagnetic radiation only in the second NIR wavelength band.

17. The system of claim 13, further comprising:
an automated control unit that determines a motion plan for the vehicle based on vehicle handling limits for the plurality roadway areas based on tire-road friction estimates for the plurality of roadway areas and controls actuator systems of the vehicle according to the motion plan.

18. A system, comprising:
a sensor group that is mounted to a vehicle and includes:
one or more near infrared (NIR) light sources that output electromagnetic radiation in at least a first NIR wavelength band and a second NIR wavelength band,
a first NIR imaging device that is sensitive to electromagnetic radiation in the first NIR wavelength band and outputs a first NIR raster image representing a roadway ahead of the vehicle, wherein the first NIR imaging device includes a first NIR filter that passes only electromagnetic radiation in the first NIR wavelength band, and the first NIR wavelength band includes a wavelength of 905 nm,
a second NIR imaging device that is sensitive to electromagnetic radiation in the second NIR wavelength band and outputs a second NIR raster image representing the roadway ahead of the vehicle, wherein the second NIR imaging device includes a second NIR filter that passes only electromagnetic radiation in the second NIR wavelength band, and the second NIR wavelength includes a wavelength of 1310 nm,
a first long wave infrared (LWIR) imaging device that is sensitive to electromagnetic radiation in a first LWIR wavelength band and outputs a first LWIR raster image representing the roadway ahead of the vehicle, wherein the first LWIR imaging device includes a first LWIR filter that passes only electromagnetic radiation in the first LWIR wavelength band, and the first LWIR wavelength band includes a wavelength of 8000 nm, and
a second LWIR imaging device that is sensitive to electromagnetic radiation in a second LWIR wavelength band and outputs a second LWIR raster image representing the roadway ahead of the vehicle, wherein the second LWIR imaging device includes a second LWIR filter that passes only electromagnetic radiation in second first LWIR wavelength band, and the second LWIR wavelength band includes a wavelength of 11000 nm; and a friction estimation unit that defines image portions corresponding to roadway areas of each of the first NIR raster image, the second NIR raster image, the first LWIR raster image, and the second LWIR raster image, and determines tire-road friction estimates for the roadway areas using corresponding ones of the image portions.

19. The system of claim 18, wherein the friction estimation unit determines temperature values for the plurality of roadway areas using at least one of the first NIR raster image or the second NIR raster image, the friction estimation unit determines lubricant state values for the plurality of roadway areas using the first LWIR raster image and the second LWIR raster image, the friction estimation unit determines lubricant thickness values for the plurality of roadway areas using the first NIR raster image and the second NIR raster image, and the friction estimation unit determines the tire-road friction estimates for the plurality of roadway areas based on the temperature values, the lubricant state values, and the lubricant thickness values.

20. A method, comprising:
obtaining images from infrared cameras that are mounted to a vehicle, wherein the images show a plurality of roadway areas that are located ahead of the vehicle;
determining parameter values for the plurality of roadway areas based on the images output by the infrared cameras, wherein the parameter values include temperature values, lubricant state values, and lubricant thickness values;
determining tire-road friction estimates that include an individual tire-road friction estimates for roadway areas from the plurality of roadway areas using the parameter values;
determining a trajectory for the vehicle based on the tire-road friction estimates, wherein the trajectory for the vehicle traverses at least some roadway areas from the plurality of roadway areas; and
controlling actuator systems of the vehicle such that the vehicle follows the trajectory.

21. The method of claim 20, wherein the parameter values for the plurality of roadway areas also include lubricant composition values for the plurality of roadway areas.

22. The method of claim 20, wherein determining the trajectory for the vehicle includes determining vehicle handling limits for the plurality of roadway areas based on the tire-road friction estimates for the plurality of roadway areas.

* * * * *